Nov. 22, 1927.
R. A. STREIFF
AUTOMOBILE MIRROR
Filed Feb. 10, 1923
1,650,161
4 Sheets-Sheet 2
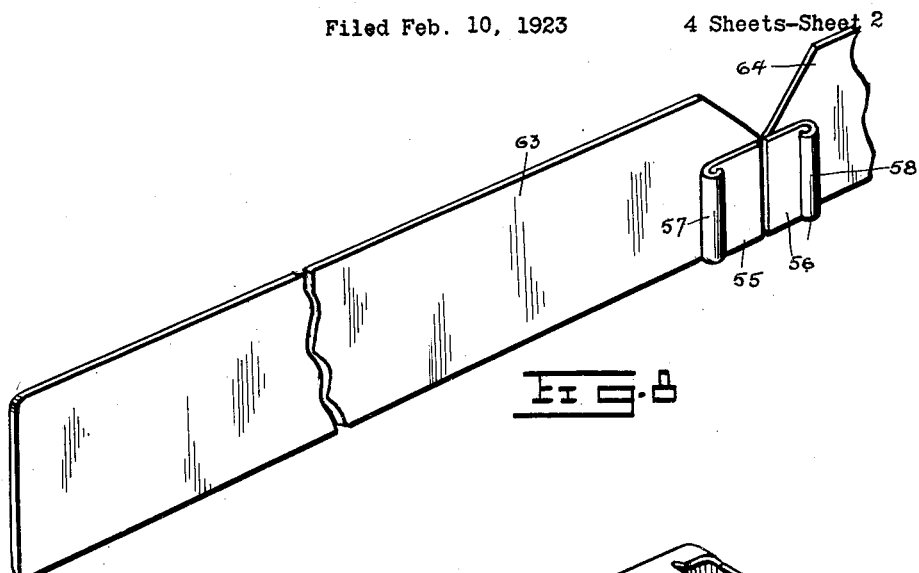
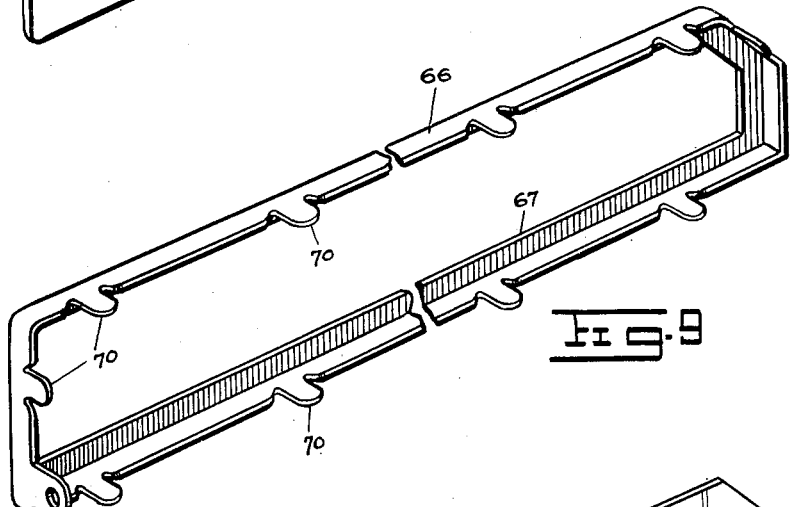
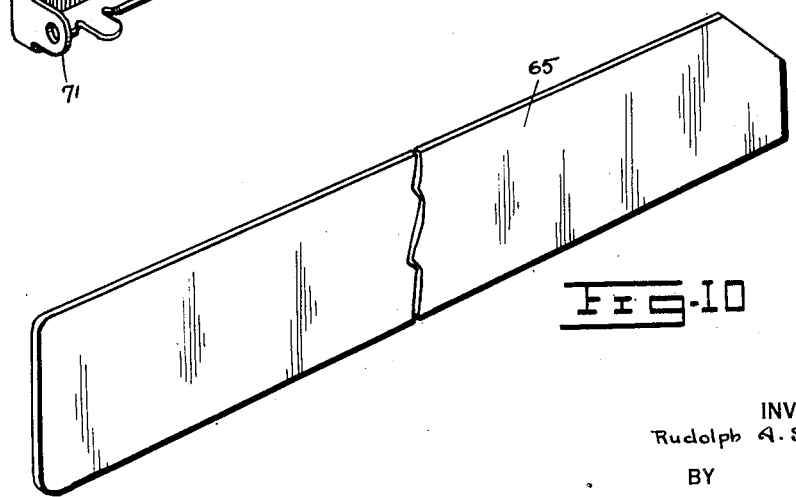
INVENTOR
Rudolph A. Streiff
BY
Frank Keifer
ATTORNEY

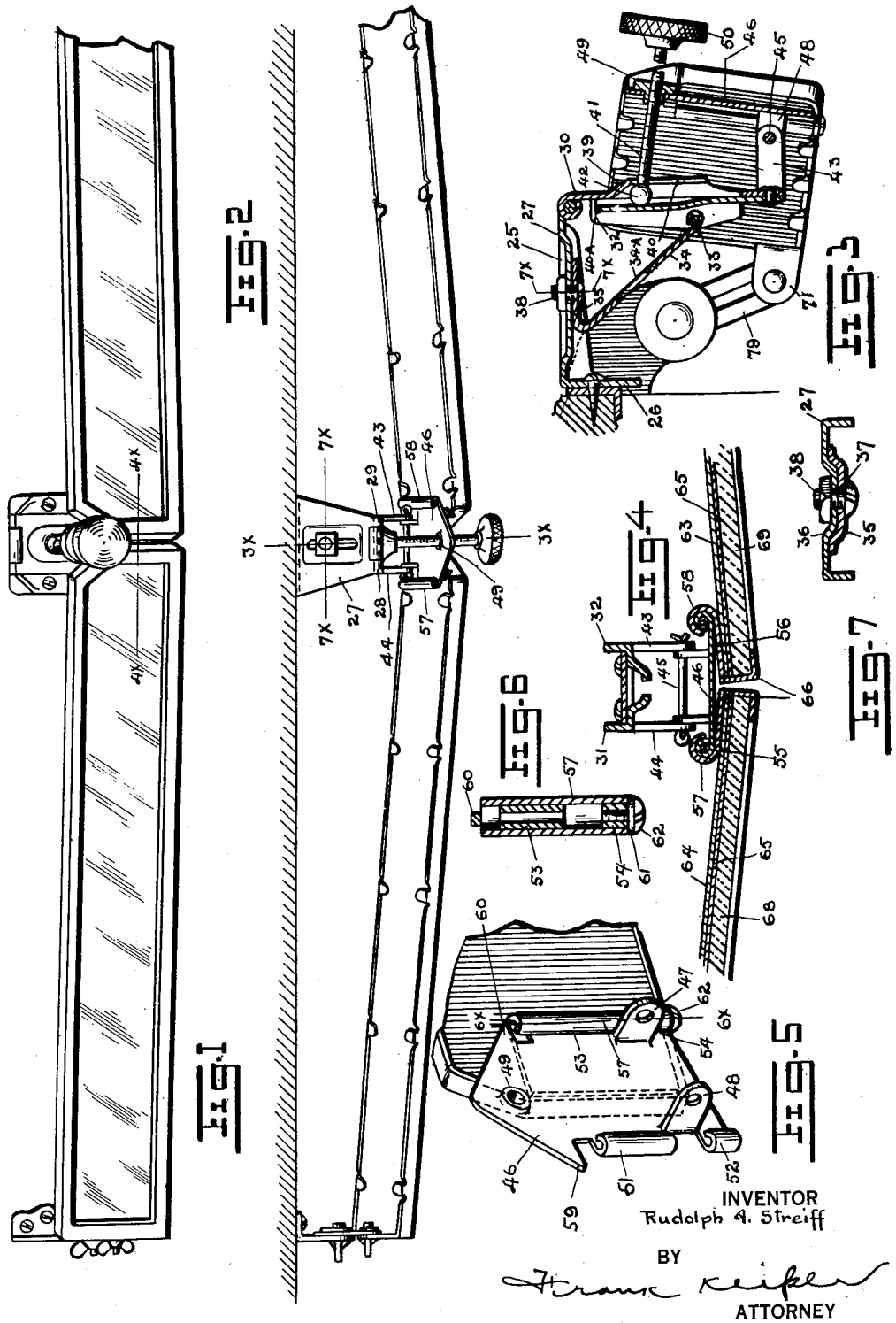

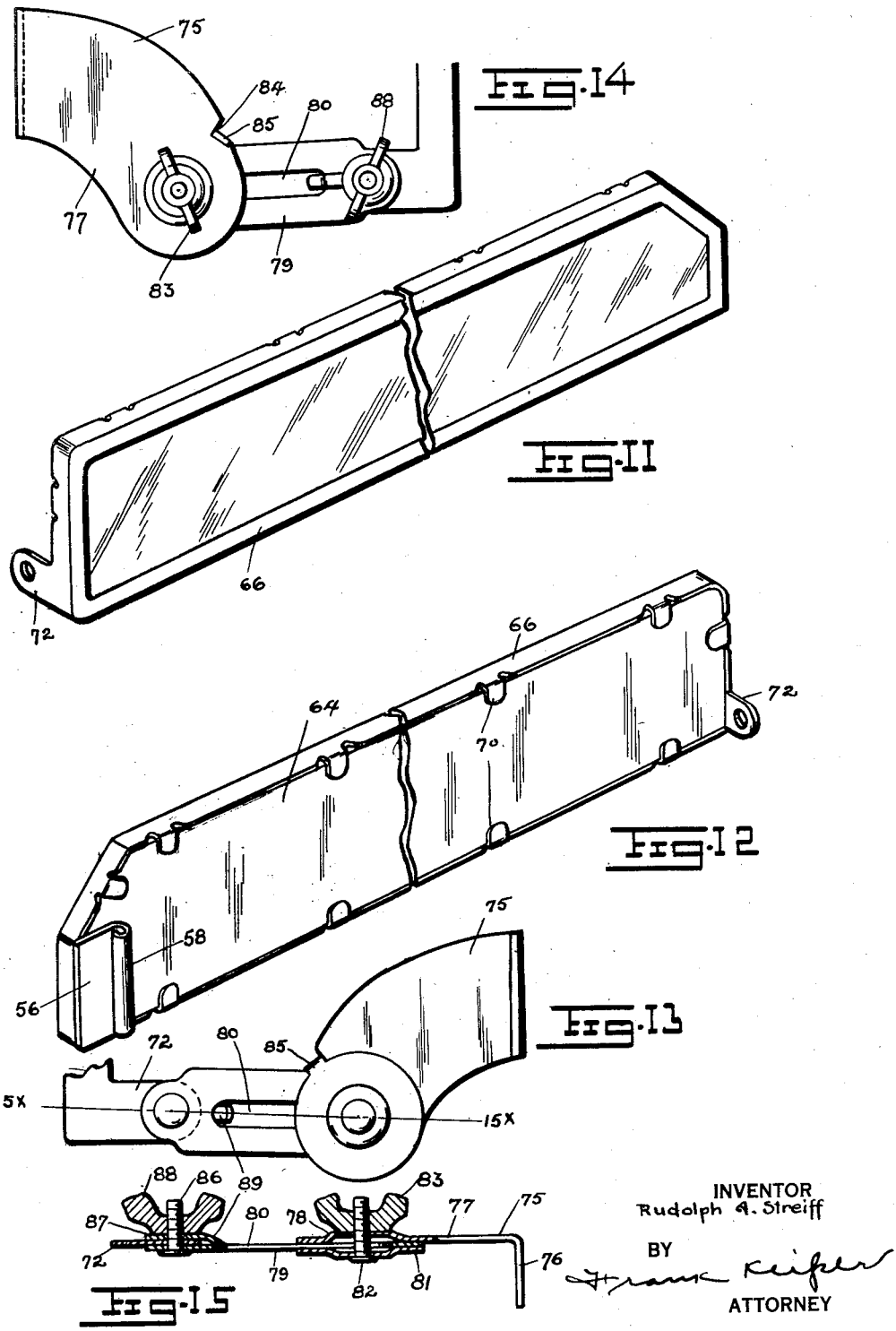

Nov. 22, 1927.
R. A. STREIFF
AUTOMOBILE MIRROR
Filed Feb. 10, 1923
1,650,161
4 Sheets-Sheet 4
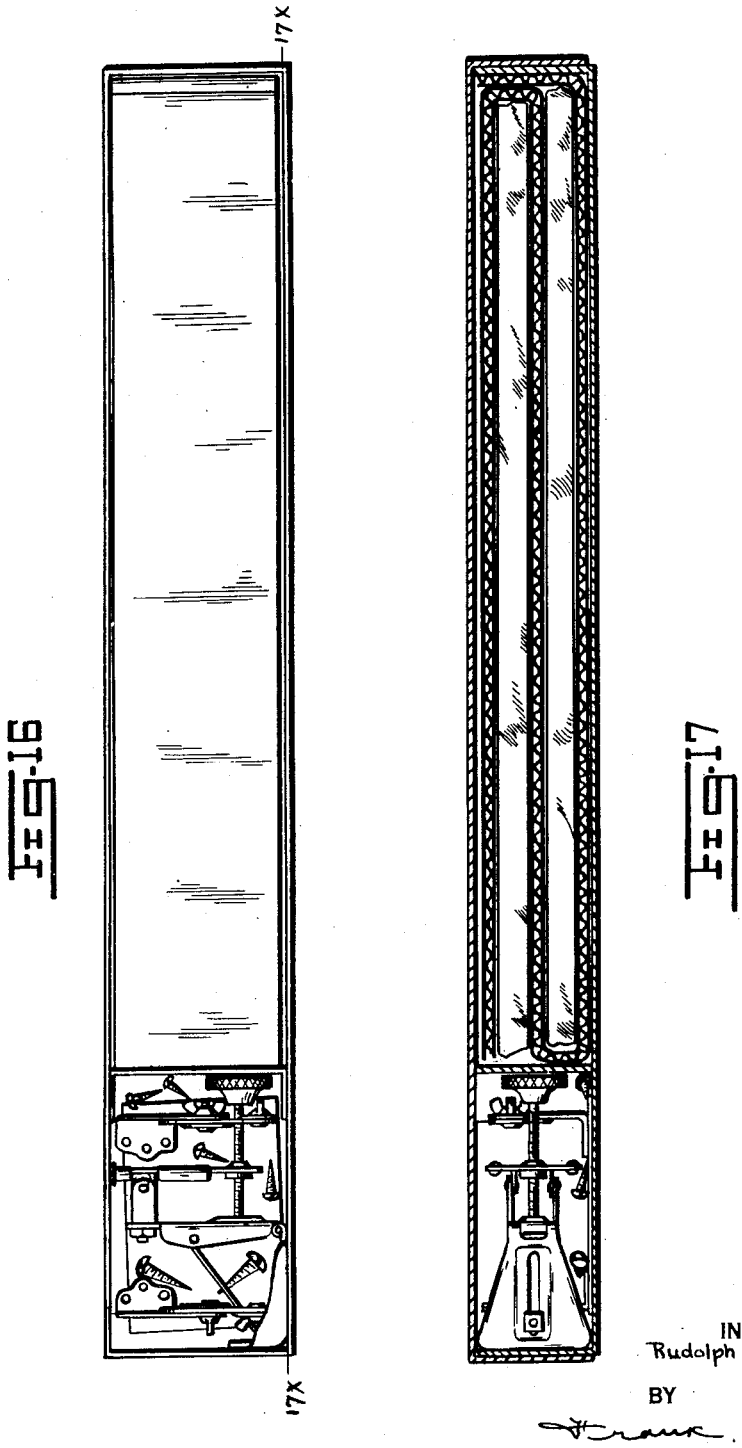
INVENTOR
Rudolph A. Streiff
BY
ATTORNEY Patented Nov. 22, 1927.

1,650,161

UNITED STATES PATENT OFFICE.

RUDOLPH A. STREIFF, OF ROCHESTER, NEW YORK, ASSIGNOR TO FRANK KEIPER, OF ROCHESTER, NEW YORK.

AUTOMOBILE MIRROR.

Application filed February 10, 1923. Serial No. 618,422.

The object of this invention is to provide a new and improved form of mirror for an automobile, either open or closed car, by which the operator is enabled to see both the road ahead of him and the traffic back of him without turning his head, the inventions of this application being an improvement on the mirror shown in the prior Patent 1,376,377 issued April 26, 1921, to Charles Mee.

This and other objects of this invention will be fully illustrated in the drawings, described in the specification and pointed out in the claims at the end thereof.

In the drawings:

Figure 1 is a front elevation of a modification of the center bracket containing my improvement together with the mirror sections.

Figure 2 is a top plan view of the mirror sections and brackets containing my improvements.

Figure 3 is a vertical section on the line $3^x$—$3^x$ of Figure 2.

Figure 4 is a horizontal section on the line $4^x$—$4^x$ of Figure 1.

Figure 5 is a perspective view of the swinging leaf of the bracket showing one of the mirror sections swiveled thereon.

Figure 6 is a vertical section on the line $6^x$—$6^x$ of Figure 5.

Figure 7 is a vertical section through the top of the supporting bracket, the section being taken on the line $7^x$—$7^x$ of Figures 2 and 3.

Figure 8 is a rear perspective view of the metal backing plate for the mirror sections.

Figure 9 is a perspective view of the metal frame surrounding one of the mirror sections.

Figure 10 is a perspective view of the soft pad interposed between the glass mirror and the backing plate.

Figure 11 is a perspective view of the frame and glass mirror of one of the sections assembled viewed from the front.

Figure 12 is a perspective view showing the frame and backing plate of one of the sections assembled viewed from the rear.

Figure 13 is a side elevation of one of the end brackets viewed from the end of the mirror.

Figure 14 is a side elevation of the bracket shown in Figure 13 viewed from the center of the mirror.

Figure 15 is a horizontal section on the line $15^x$—$15^x$ of Figure 13.

Figure 16 is a top plan view of the mirror knocked down and boxed ready for shipment.

Figure 17 is a vertical section on the line $17^x$—$17^x$ in Figure 16 showing the mirror knocked down and packed ready for shipment.

In the drawings like reference numerals indicate like parts.

In the drawings, in Figure 3 I have shown a vertical section of an improved form of bracket in which 25 indicates a stationary bracket having a base 26 by which it is attached to the car structure and a rearwardly extending arm or pedestal 27. The end of the pedestal 27 is slotted to form two ears on the end thereof with a recess between them. These ears are bent round and turned under to form knuckles 28 and 29 forming a part of the hinge bearing on the outer end of the pedestal 27. Swinging from the outer end of the pedestal 27 is the swinging leaf 30 of the hinge having a knuckle on the top thereof to receive a hinge pin and having the flanges 31 and 32 on the sides thereof which flanges are perforated to receive the pin 33.

On this pin 33 is pivotally mounted a brace 34 which extends upwardly and rearwardly and is bent down and forward at its upper end to form a base 35. Both the base 35 and pedestal 27 are embossed to form grooves 36 so that the grooves of the pedestal 27 nests into the groove on the base 35. The groove on the pedestal is slotted as indicated at 37 and the base is perforated to receive the machine screw 38 which passes through the slot by which the base and pedestal are clamped together. The base of the brace 34 is adjustable forward and back on the pedestal for the purpose of changing the position of the swinging leaf 30. The leaf 30 should preferably be fixed in a vertical position. In this way an adjustment of the bracket is secured for different makes of cars. The brace 34 is provided with a hole $34^A$ through which a screw driver can be inserted to reach the head of the machine screw 38. After the adjustment above described is made for the car the leaf 30 remains stationary.

On the leaf 30 is embossed a guide 39 in which guide is provided a slot 40 along which the screw 41 is adapted to travel with its ball 42 engaged with the guide. The ball 42 is held firmly in the guide by the spring plate 40^A which is fastened to the bottom of the leaf 30 and extends upwardly between the flanges 31 and 32 of the leaf 30.

On the bottom of the leaf 30 are provided the ears 43 and 44 which support a pin 45 on which is mounted to swing the swinging leaf 46 which is provided with the ears 47 and 48 which engage with the pin 45 to permit the leaf 46 to swing thereon. The leaf 46 is provided with a bushing or boss 49 at the top suitably threaded to receive the screw 41 which screw is turned by the head 50. On the sides of the swinging leaf 46 are formed the knuckles 51 and 52, 53 and 54, which knuckles are placed at right angles to the ears 47 and 48. The knuckles are also hinge pins on which swing the leaves 55 and 56 which have larger knuckles 57 and 58 formed on the inner ends thereof. The leaf 46 is formed with the shoulders 59 and 60 at the top which overhang the knuckles 51 and 53 and form an end stop or fixed shoulder for the knuckles 57 and 58 pivoted thereon. The knuckles 52 and 54 are threaded to receive a screw 62. The knuckles 57 and 58 are held in place from below by the screws 62 and washer 61 which form removable shoulders on which they rest and which hold these knuckles in place against the shoulders 59 and 60.

The leaves 55 and 56 are fastened to the back plates 63 and 64 of the mirror sections by spot welding or similar expedient.

These mirror sections and the construction of them will now be described:

Between the backing plates 63 and 64 and the back of the glass mirrors 68 and 69 are interposed the soft pads 65 made preferably of cardboard. The glass mirror, pad and backing plate are all enclosed in a frame 66 having a flange 67 on the rear edge thereof and having lugs 70 on the forward edge thereof which lugs are bent down or up as shown in Figure 2 to fasten the mirror, pad and backing plate in the frame. On the outer end of each frame is provided a pivot lug 71 and 72 by which it is mounted to swing.

For the purpose of supporting the ends of the mirror I provide the bracket 75 having a base 76 and a forwardly and downwardly extending arm 77 on which a boss 78 is formed. On this bracket is mounted to swing an extension arm 79 having a slot 80 provided therein. Outside of this arm is provided a locking disk 81 on which is fastened a stud 82 which stud passes through the slot 80 of the extension arm 79 and the boss 78 of the arm 77 and is provided on its outer end with a thumb nut 83. The arm 75 is recessed as indicated at 84 in which recess engages a lug 85 carried on the disk 81 by which the disk is prevented from turning on the arm 77. The extension arm 79 is securely clamped between the arm 77 and the disk 81 and is held rigidly thereby.

On the outer end of the arms 79 are provided studs 86 on which the pivot lugs 71 and 72 are adapted to swing, they being clamped in place thereon by the lock washer 87 and thumb nut 88. To prevent the washer from turning it is provided with a dog 89 integral therewith which dog engages with the slot 80.

The installation and operation of my improved mirror is as follows:

The center bracket is attached to the frame of the car and the brace 34 is adjusted to bring the leaf 30 to a vertical position as near as may be.

The end brackets are then attached to the car structure at the correct distance from the center bracket and set at the desired length, that is, with their studs 86 in the desired position and on a level with the pin 45 of the center bracket. The mirror sections at their inner ends are then pivoted on the knuckles 51 and 53 and fastened thereon and are also pivoted at their outer ends on the studs 86 and clamped thereon. The studs 86 should be adjusted forward or back and up and down if necessary to give the correct bow to the mirror sections as indicated in Figure 4.

The center bracket is set in the center of the car above the windshield and the mirror sections extend on each side thereof to practically the full width of the car. Each section is intended for a separate rider and each section is positioned at such an angle as will give its rider the best possible view of the road behind him through the back and side windows of the car. The mirrors may be tilted up or down to suit the convenience of a tall or a short driver as may be desired by the screw 41.

Either section of the mirror can be used by itself and the other section will then be omitted. The left hand section is the one in front of the driver and is the one that would ordinarily be used by itself and the right hand section would in that case be omitted.

The bracket heretofore described thus forms a support for either one or the other or both of the mirror sections.

I claim:

1. In an automobile mirror, a horizontal bracket having a base and a pedestal and a leaf hinged on the outer end of said pedestal, a brace extending diagonally from said leaf to said pedestal, said brace being pivoted to one of said members a reversely bent end at the top of said brace, said reversely bent end being adjustably connected to the other member and parallel thereto to vary the position of the leaf with respect to the pedestal.

2. In an automobile mirror, a bracket having a base and a pedestal and a leaf hinged on the outer end of said pedestal, a brace extending diagonally from said leaf to said pedestal, said leaf having flanges on the sides thereof to which said brace is pivoted said brace having its end reversely bent to adjustably engage with said pedestal and increase its frictional contact therewith but allow it to be adjusted back and forth thereon.

3. In an automobile mirror, a bracket having a base and a pedestal and a leaf hinged on the outer end of said pedestal, a brace extending diagonally from said leaf to said pedestal, said leaf having flanges on the sides thereof to which said brace is pivoted said brace having its end reversely bent to engage with said pedestal, said pedestal having a slot therein, a bolt passing through the end of the brace and the slot in the pedestal clamping said parts together.

4. In an automobile mirror, a bracket having a base and a pedestal and a leaf hinged on the outer end of said pedestal, a brace extending diagonally from said leaf to said pedestal, said leaf having flanges on the sides thereof to which said brace is pivoted said brace having its end reversely bent to engage with said pedestal, said pedestal having a slot therein, a bolt passing through the end of the brace and the slot in the pedestal clamping said parts together, said pedestal and the end of the brace being embossed to form grooves which nest together to hold them in line with each other.

5. In an automobile mirror, a bracket having a base and a pedstal and a leaf hinged on the outer end of said pedestal, a brace extending diagonally from said brace to said pedestal, said leaf having flanges on the sides thereof to which said brace is pivoted said brace having its end reversely bent to engage with said pedestal, said pedestal having a slot therein, a bolt passing through the end of the brace and the slot in the pedestal clamping said parts together, a pair of ears provided on said leaf extending forwardly therefrom a plate hinged to swing between said ears.

6. In an automobile mirror, a bracket having a base and a pedestal and a leaf hinged on the outer end of said pedestal, a brace extending diagonally from said brace to said pedestal, said leaf having flanges on the sides thereof to which said brace is pivoted said brace having its end reversely bent to engage with said pedestal, said pedestal having a slot therein, a bolt passing through the end of the brace and the slot in the pedestal clamping said parts together, a pair of ears extending forward from said leaf, a plate hinged to swing between said ears, a screw threaded into said plate and engaging with said leaf by which said plate can be pivotally adjusted on said leaf.

7. In an automobile mirror, a leaf, a plate pivoted thereon, a screw passing through said plate and engaging with said leaf by which said plate can be pivotally adjusted on said leaf, said plate having knuckles formed on the edges thereof and forming pivots at each side thereof, a mirror mounted to swing on each of said pivots means for centering said mirrors on said plate and prevent an up and down movement thereof.

8. In an automobile mirror; a leaf, a plate pivoted thereon, a screw passing through said plate and engaging with said leaf by which said plate can be pivotally adjusted on said leaf, said plate having knuckles on the edges thereof forming pivots thereon, a shoulder at one end of each of said knuckles a mirror mounted to swing on each of said pivots.

9. In a mirror; a support having a horizontal hinge at the bottom thereof; a plate mounted to swing on said hinge, means for adjusting said plate, a knuckle formed on the vertical edge of said plate, a mirror having a reflector, a frame surrounding the sides and back of said reflector, a knuckle fastened to said frame at one end of the mirror, said knuckle engaging with the knuckle on said plate to swing thereon at right angles to the swinging of said plate.

10. In a mirror; a support having a horizontal hinge at the bottom thereof; a plate mounted to swing on said hinge, means for adjusting said plate, knuckles formed on the vertical edges of said plate a mirror having a reflector, a frame surrounding the sides and back of said reflector, a knuckle fastened to said frame at one end of the mirror, said knuckle engaging with one of the knuckles on said plate to swing thereon at right angles to the swinging of said plate.

11. In a mirror; a support having a horizontal hinge at the bottom thereof; a plate mounted to swing on said hinge, means for adjusting said plate, a knuckle formed on the vertical edge of said plate, a mirror having a reflector, a frame surrounding the sides and back of said reflector, a knuckle fastened to said frame at one end of the mirror, said knuckle engaging with the knuckle on said plate to swing thereon at right angles to the swinging of said plate, a screw engaging said knuckles to hold them together.

12. In a mirror; a support having a horizontal hinge at the bottom thereof; a plate mounted to swing on said hinge, means for adjusting said plate, a knuckle formed on the vertical edge of said plate, a mirror having a reflector, a frame surrounding the sides and back of said reflector, a knuckle fastened to said frame at one end of the mirror, said knuckle engaging with the knuckle on said plate to swing thereon at right angles to the swinging of said plate, a screw engaging said knuckles to hold them together, said screw having a head thereon engaging the knuckles at one end, a shoulder on the plate engaging the outer knuckle at the other end.

13. In an automobile mirror, the combination of a center bracket, a leaf hinged to said center bracket and adapted to be held in an angular position thereon, a second leaf hinged to said first leaf with one end thereof and adjustably connected to said first leaf at the other end thereof, a knuckle formed on each side of said second leaf, a mirror mounted to swing on each of said knuckles, a fixed shoulder formed on said second leaf above each of said knuckles and a removable shoulder provided below each of said knuckles, said rigid and said removable shoulders being adapted to hold said mirrors on said knuckles.

In testimony whereof I affix my signature.

RUDOLPH A. STREIFF.